(12) United States Patent
Chen et al.

(10) Patent No.: US 12,254,353 B2
(45) Date of Patent: Mar. 18, 2025

(54) CONTROL FLOW INVARIANT RESOURCE IDENTIFICATION

(71) Applicants: Advanced Micro Devices, Inc., Santa Clara, CA (US); ATI Technologies ULC, Markham (CA)

(72) Inventors: Zhuo Chen, Markham (CA); Steven J. Tovey, Milton Keynes (GB)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 516 days.

(21) Appl. No.: 17/564,092

(22) Filed: Dec. 28, 2021

(65) Prior Publication Data
US 2023/0205584 A1 Jun. 29, 2023

(51) Int. Cl.
*G06F 9/50* (2006.01)
*G06T 1/20* (2006.01)
*G06T 1/60* (2006.01)

(52) U.S. Cl.
CPC .............. *G06F 9/5016* (2013.01); *G06T 1/20* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 9,424,079 B2 | 8/2016 | Rossbach et al. | |
| 9,465,770 B2 | 10/2016 | Guerin et al. | |
| 9,652,286 B2 | 5/2017 | Fan | |
| 10,887,240 B2 * | 1/2021 | Mizrahi | H04L 47/2441 |
| 11,068,641 B1 | 7/2021 | Wu et al. | |
| 2005/0192979 A1 | 9/2005 | Keller et al. | |
| 2010/0257538 A1 | 10/2010 | Zhao et al. | |
| 2011/0321051 A1 | 12/2011 | Rastogi | |
| 2013/0232495 A1 | 9/2013 | Rossbach et al. | |
| 2013/0290980 A1 * | 10/2013 | Kemp | G06F 9/544 719/312 |
| 2013/0332937 A1 | 12/2013 | Gaster et al. | |
| 2015/0294436 A1 * | 10/2015 | Jin | G06F 12/00 345/543 |
| 2016/0357516 A1 | 12/2016 | Kogel et al. | |
| 2017/0060637 A1 * | 3/2017 | Persson | G06F 21/55 |
| 2017/0109214 A1 | 4/2017 | Raman et al. | |
| 2017/0139680 A1 | 5/2017 | Proctor et al. | |
| 2018/0181446 A1 | 6/2018 | Gabriel et al. | |
| 2018/0349145 A1 | 12/2018 | Tye et al. | |

(Continued)

OTHER PUBLICATIONS

Jaaskelainen, P., et. al., "Exploiting Task Parallelism with OpenCL: A Case Study", Journal of Signal Processing Systems, 14 pgs., 2019.

(Continued)

*Primary Examiner* — Umut Onat
(74) *Attorney, Agent, or Firm* — Volpe Koenig

(57) ABSTRACT

In order to efficiently process graphics data, operations are performed including allocating a first set of resource slots for a first execution instance of a pipeline shader program; correlating the first set of resource slots with graphics pipeline passes; and on a second execution instance of the pipeline shader program, assigning resource slots, from the first set of resource slots, to the graphics pipeline passes, based on the correlating.

20 Claims, 6 Drawing Sheets

(56) References Cited

U.S. PATENT DOCUMENTS

| | | |
|---|---|---|
| 2020/0090298 A1 | 3/2020 | Gould et al. |
| 2020/0097333 A1 | 9/2020 | Jain et al. |
| 2020/0301753 A1 | 9/2020 | Havlir et al. |
| 2020/0371843 A1 | 11/2020 | Garg et al. |
| 2020/0401444 A1 | 12/2020 | Hirota et al. |
| 2021/0149719 A1 | 5/2021 | Jones et al. |
| 2021/0149734 A1 | 5/2021 | Gurfinkel et al. |
| 2021/0373892 A1 | 12/2021 | Tovey et al. |
| 2021/0373957 A1 | 12/2021 | Tovey et al. |
| 2022/0050790 A1* | 2/2022 | Goodman ............ G06F 12/109 |

OTHER PUBLICATIONS

Wang, Z., et. al., "Simultaneous Multikernel GPU: Multi-tasking Throughput Processors via Fine-Grained Sharing", IEEE Xplore, 12 pgs., 2016.

Lutz, T., et. al., "Helium: A Transparent Inter-kernel Optimizer for OpenCL", GPGPU-8, ACM, 11 pgs., 2015.

El-Rewini, H., "Task Partitioning and Scheduling on Arbitrary Parallel Processing Systems", Thesis submitted to Oregon State University, Chapters 1-3, 5; 114 pgs., Nov. 21, 1989.

Terrell, R., "Concurrency in .Net: Modern Patterns of Concurrent and Parallel Programming", Manning Publications, Chapter 7, 38 pgs., 2018.

\* cited by examiner

CONTROL FLOW INVARIANT RESOURCE IDENTIFICATION

BACKGROUND

Graphics processors are capable of generating frames or performing other calculations using multiple passes. Managing resources for such passes is important.

BRIEF DESCRIPTION OF THE DRAWINGS

A more detailed understanding can be had from the following description, given by way of example in conjunction with the accompanying drawings wherein.

DETAILED DESCRIPTION

A disclosed technique includes allocating a first set of resource slots for a first execution instance of a pipeline shader program; correlating the first set of resource slots with graphics pipeline passes; and on a second execution instance of the pipeline shader program, assigning resource slots, from the first set of resource slots, to the graphics pipeline passes, based on the correlating.

Figure 1:
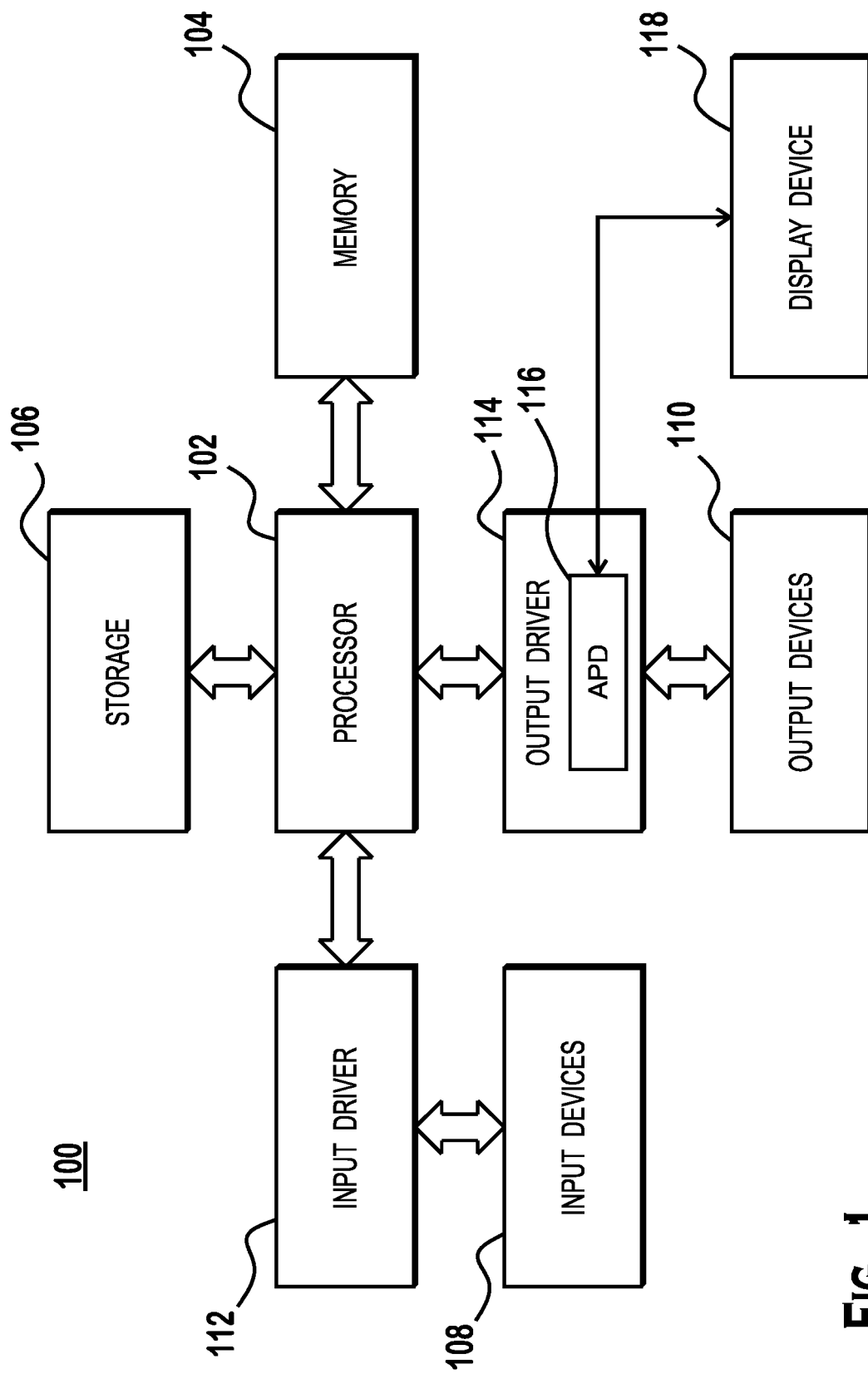
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
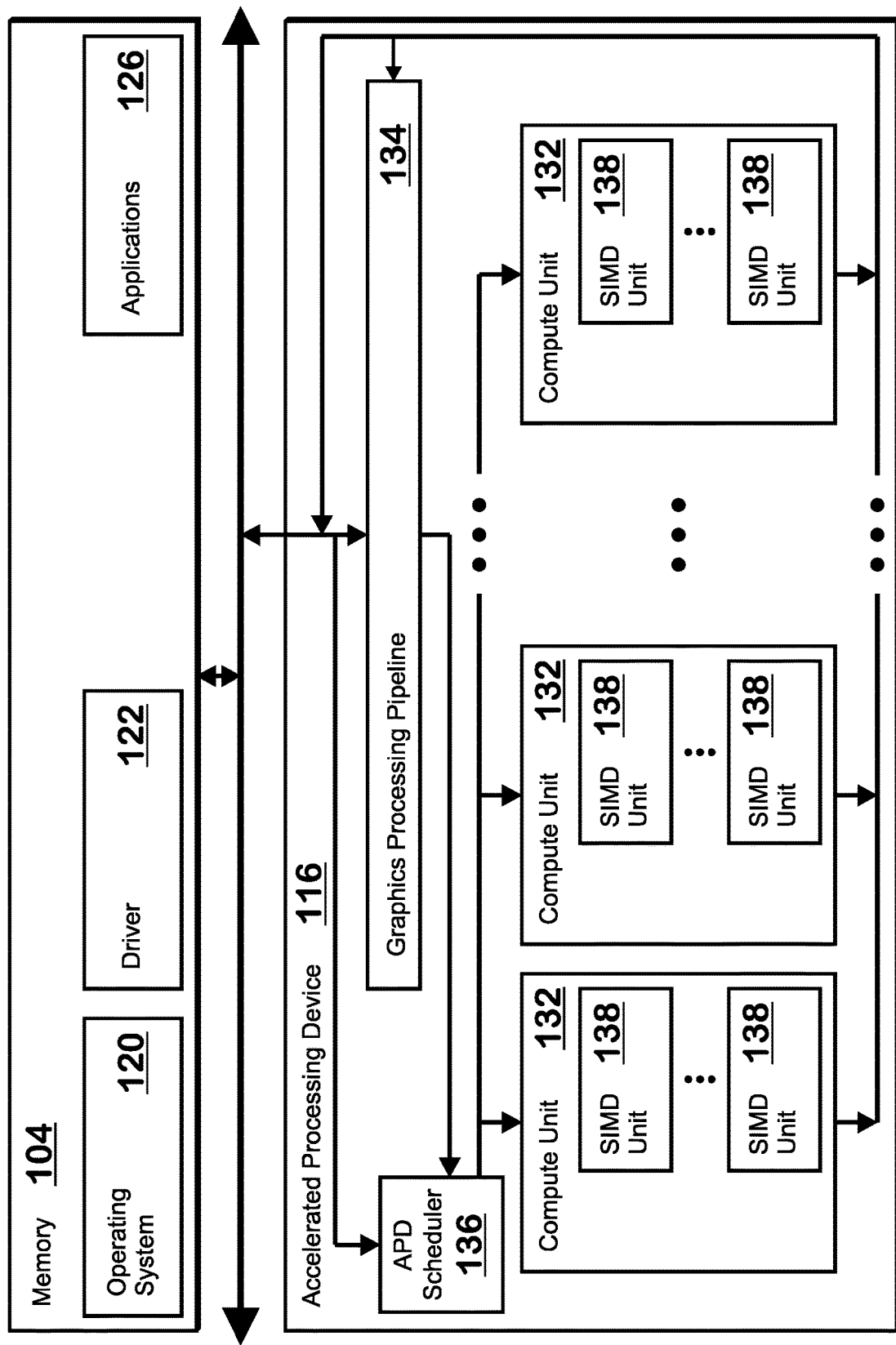
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
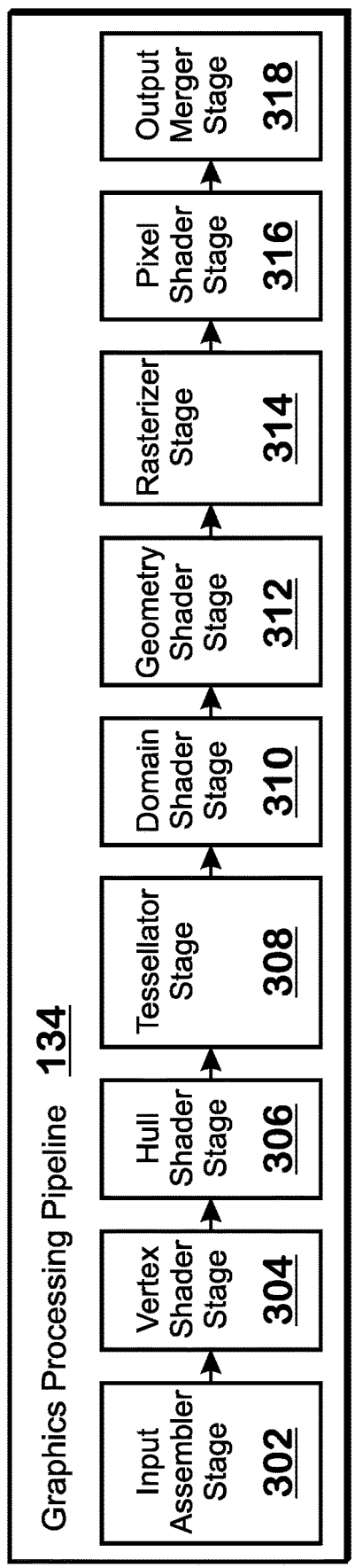
FIG. 3 is a block diagram showing additional details of the graphics processing pipeline illustrated in FIG. 2.

FIG. 3 is a block diagram showing additional details of the graphics processing pipeline 134 illustrated in FIG. 2.

The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

As described, the graphics processing pipeline 134 accepts input such as geometry, textures, and the like, and generates outputs such as a rendered image. The graphics processing pipeline 134 is capable of operating in a large variety of modes, with one or more of the stages disabled. In addition, in each such mode, any combination of shader programs can execute at any of the programmable stages that are enabled. To generate a frame of graphics (or to perform any type of calculation using the APD 116), it is possible to chain together multiple instances of execution through the graphics processing pipeline 134. Each such instance, referred to sometimes herein as a "pass" consumes some input (referred to herein sometimes as "resources") and produces some output (also referred to herein as "resources.") It is also possible to include compute shading passes into this chain. The compute shading passes do not necessarily use any portion of the graphics processing pipeline 134 and are capable of executing on the compute units 132 without communicating with any of the stages of the graphics processing pipeline 134. In sum, to generate a frame of graphics or to generate any other output, it is possible for the APD 116 to chain together multiple graphics and/or compute passes.

Often, the combination of passes used to generate a frame of output (or to generate other output) is specified programmatically in a pipeline shader program. The pipeline shader program generally defines the resources used by passes and triggers execution of those passes. It is possible for the pipeline shader program to execute on the processor 102, the APD 116, or on any other device.

Figure 4:
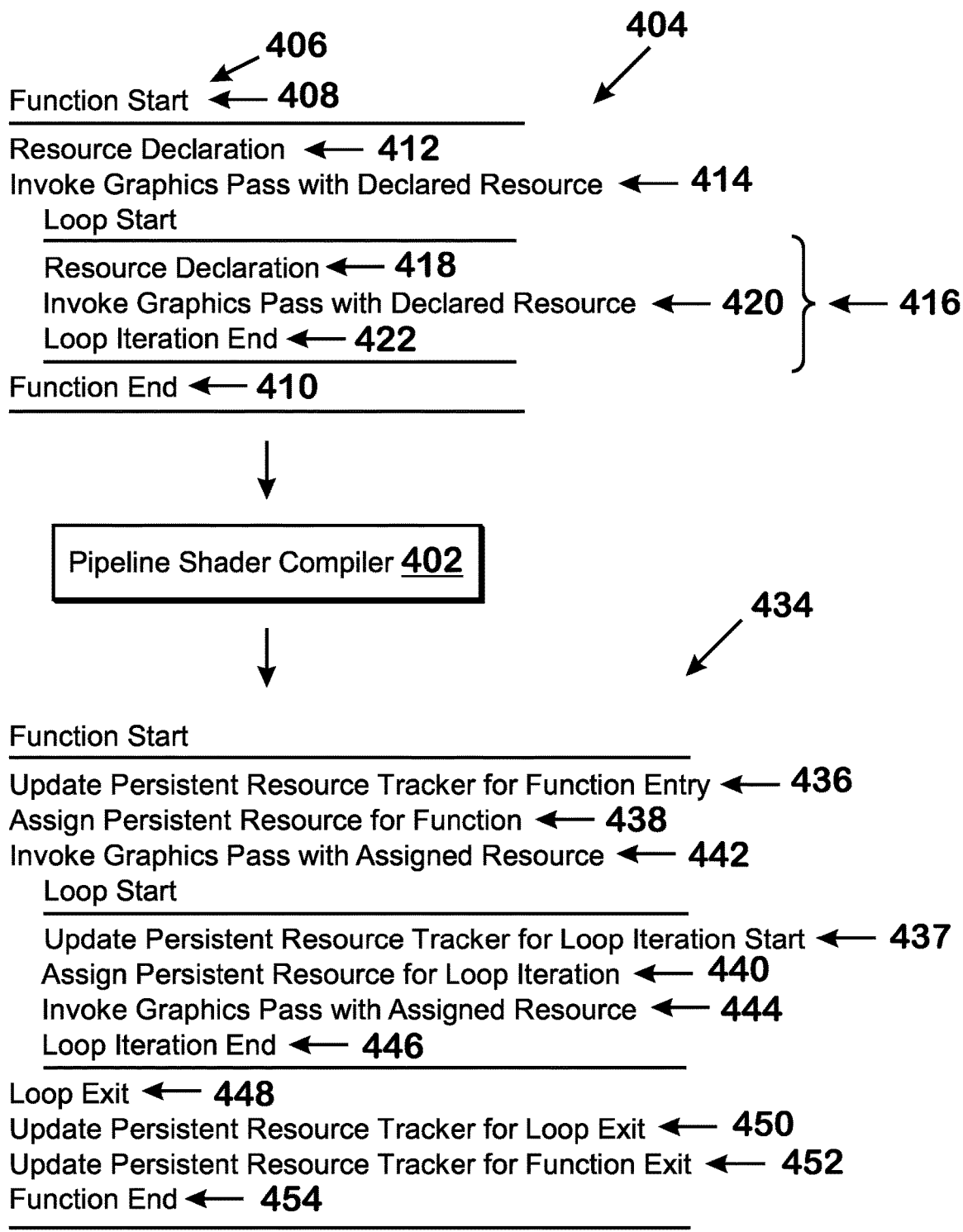
FIG. 4 illustrates a portion of an example pipeline shader program.

FIG. 4 illustrates a portion of an example pipeline shader program 404. Specifically, a single function 406 is illustrated, with the function start 408 and function end 410 delineating the start and end of the function. The function 406 includes a resource declaration 412. The resource declaration 412 associates one or more variables that are local to the function with one or more resource slots. A resource slot is a portion of memory that associates a resource identifier (also "resource handle") with characteristics of a resource. Some characteristics of the resource include memory location of the resource data, size of the resource, type of the resource, and other information. In sum, a resource slot is an item of data that defines and allows access to resources. The one or more variables in the function 406 thus identify the resource slots that refer to and describe resources.

It is possible that, upon allocation of a resource slot, the actual resource data has not yet been allocated. In some examples, a resource slot is created by the pipeline shader program. Subsequently, a first graphics pass or compute pass references that resource. At this point, the APD 116 allocates the space for the resource itself. In that instance, the APD 116 updates the resource slot to include the memory location of the newly allocated resource.

The function 406 also includes graphics pass invocation using the declared resource(s) 414. The graphics pass invocation 414 invokes a graphics pass on the APD 116, and this graphics pass uses the resources declared in the resource declaration 412. More specifically, the graphics pass invocation 414 passes the local variables declared in the resource declaration 412 to the graphics pass. Thus the graphics pass invocation 414 informs the APD 116 to perform the graphics pass using resource identified by the resource slots that are associated with these local variables. Again, if it is the first time that a particular resource slot is used, and the resource itself is not yet allocated, the APD 116 allocates that resource.

The function 406 also includes a loop 416. The loop repeatedly executes the contents of the loop 416 until an exit condition is met. Each time the contents of the loop execute is referred to as an iteration. The loop itself includes a resource declaration 418, a graphics pass invocation 420 using the resource declared in the same iteration of the loop, and a loop iteration end 422 which marks the end of the loop iteration. In each loop iteration, the resource declaration associates one or more variables for the current loop iteration with one or more resource slots for the current loop iteration. Different loop iterations can declare resources having different characteristics, if the resource declaration is in some way based on iteration number. For example, it is possible that the resources declared in different iterations have different sizes. The function end 410 indicates the end of the function 410.

There are potential memory-related issues that can occur with the resource declarations indicated. One issue is related to the amount of work associated with allocating resources. More specifically, as described elsewhere herein, when the APD 116 performs a pass, the APD 116 allocates memory for resources for which such allocation has not yet been made. If such resources had to be allocated each frame, then a substantial amount of work would be performed each frame. Thus performance can be improved by preventing allocations in the event that the same resource is needed between frames or in the event that a resource having the same exact characteristics can be used in different frames.

Some resources are "static" resources that are used over multiple frames. Other resources are not static resources and are thus only used on one frame. For both static and non-static resources, it is possible to reduce allocations by re-using the resources between frames. For static resources, it is clear that the same resource should be used. For non-static resources, it is still advantageous to reuse the same resource because, in each frame, since the resource has the same characteristics (e.g., size, type), the same memory location can be reused to store the data for the resource. However, the resource declarations 412 of the pipeline shader programs do not explicitly identify an identical resource for each frame. Thus, techniques are provided herein for automatically associating the resource variables within pipeline shader programs with identical resources across frames.

As shown in FIG. 4, the pipeline shader compiler 402 accepts a pipeline shader program 404 and converts the pipeline shader program 404 into a modified pipeline shader program 434. The modified pipeline shader program 434 includes instructions to update a persistent resource tracker for function entry 436, as well as instructions to update a persistent resource tracker for loop iteration start 437. These instructions help to maintain a persistent resource tracker that identifies resources based on code flow. In some examples, the persistent resource tracker includes or is embodied as a graph as described with respect to FIG. 5.

The persistent resource tracker associates positions in execution flow with resource slots, so that in each frame, when the pipeline shader is executed, the assign persist resource instructions (e.g., assign persistent resource for function 438 and assign persistent resource for loop iteration 440) assigns each local variable to the same resources that the local variable was assigned to in the previous frame. In an initial frame, the assign persistent resource instruction allocate resource slots (which again are linked to actual resources by the APD 116), but in subsequent frames, the allocation does not occur and each local variable is assigned to the same resource. In some examples, the update persistent resource tracker for function entry instruction 436 and the update persistent resource tracker for loop iteration start 437 indicates sufficient characteristics of the resources in the function or the loop iteration, respectively, so that upon first encountering those instructions, the instructions are able to allocate a resource slot with the correct characteristics (e.g., resource size, type, and the like). The invoke graphics pass with assigned resource 442 and invoke graphics pass with assigned resource 444 invoke the graphics pass outside and inside the loop, respectively. The loop iteration end 446 indicates the end of the iteration. The loop exit 448 indicates an exit from the loop. The instruction to update the persistent resource tracker for the loop exit 450 updates the persistent resource tracker for the loop exit, returning the tracker to the context outside of the loop. The update persistent resource tracker for function exit 452 updates the persistent resource tracker for the function exit, returning the tracker to the context of the code to which the function returns (if such code exists). The function end 454 indicates the end of the function.

In general, the persistent resource tracker maintains a data structure that indicates the control flow of the pipeline shader program. Each node in the data structure associates a position in the control flow with one or more resource slots. The structure of the data structure tracks the control flow by recording the places that a new function is called, a loop is entered, a loop iteration has occurred, a loop has exited, and a function has returned. In addition, the data structure includes a resource identifier for each recorded function call, loop entry, and loop iteration. By tracking all of these control flow items and the associated resource identifiers, the assignment instructions (e.g., instruction 438 and instruction 440) are able to assign the correct resource slots to the correct local variables. In sum, the pipeline shader compiler 402 modifies a pipeline shader program to include instructions to capture the control flow into a resource tracker and to assign resource slots to local variables based on the state of the resource tracker. The resource slots assigned to any particular function or loop iteration are the same between frames. Thus the body of a function uses the same resource slot from frame to frame and any particular iteration of a loop uses the same resource slot from frame to frame.

Figure 5:
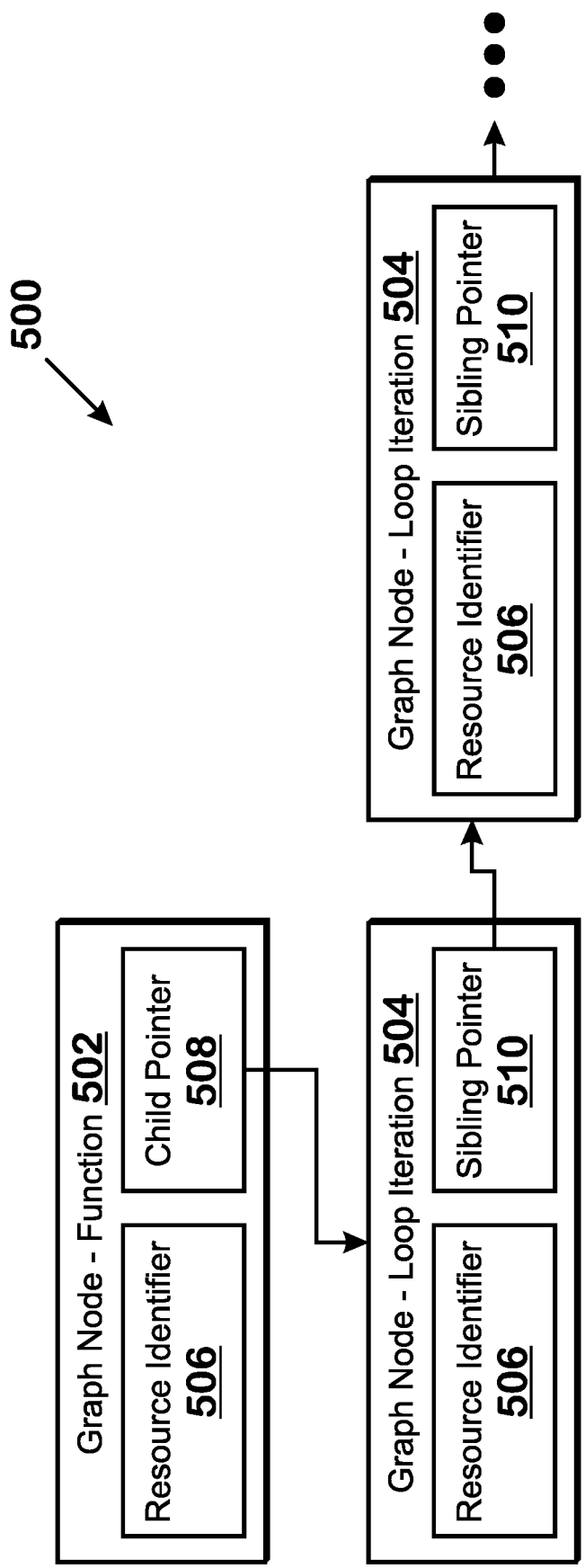
FIG. 5 illustrates a graph associated with the persistent resource tracker, according to an example.

FIG. 5 illustrates a graph 500 associated with the persistent resource tracker, according to an example. The graph 500 includes graph nodes such as function graph nodes 502 and loop graph nodes 504. Each function graph node 502 is associated with a function and each loop iteration node 504 is associated with a specific loop iteration. Each node has a resource identifier 506 that identifies the resource slots for the function or loop iteration. For a function graph node 502, the resource identifier 506 identifies the resource slots that are to be assigned to the local variables of the function by the assign persistent resource for function instruction 438. For a loop iteration graph node 504, the resource identifier 506 identifies the resource slots that are to be assigned to the local variables of the loop iteration by the assign persistent resource for loop iteration instruction 440.

For a function that has a loop, the graph node for the function 502 has a child pointer 508 that points to the first loop iteration graph node 504 for that loop. Any particular loop iteration graph node 504 optionally has a sibling pointer 510 that points to another loop iteration graph node 504. Each loop iteration graph node 504 is associated with a particular iteration of a loop (for example, the first iteration, the second iteration, and so on). A sibling pointer 510 for a loop iteration graph node 504 points to the loop iteration graph node 504 for the next loop iteration. For example, a loop iteration graph node 504 for a first loop iteration has a sibling pointer 510 that points to the loop iteration graph node 504 for the second loop iteration of the same loop.

It is possible for a loop iteration graph node 504 to have a child pointer in the event that there is a nested loop or a function call within the loop body. In the case that there is a nested loop, the child pointer 508 of an iteration points to the first loop iteration graph node 504 for the nested loop. In the case that there is a function call, the child pointer 508 points to the function graph node 502 for the function. Similarly, it is possible for the function graph nodes 502 to include a child pointer 508 for a nested function call or a loop. Each node may have multiple child pointers 508 if the corresponding function or loop has multiple loops or function calls.

An instruction illustrated in FIG. 4 assists with generating the graph as the pipeline shader program is executed. Specifically, the update persistent resource tracker for function entry 436 or the update persistent resource tracker for loop iteration start 437 generates a node if that node does not exist or accesses the information of that node if the node does exist. In general, when the pipeline shader program encounters a loop iteration or function call that the pipeline shader program has not yet encountered, the pipeline shader program adds a loop iteration graph node 504 or a function graph node 502 at the appropriate location. For example, for a function call, the pipeline shader program adds a function graph node 502 as a child node of the function graph node 502 for the function in which the function call is made. For the start of a loop, the pipeline shader program adds a loop iteration graph node 504 as a child of the function graph node 502 or loop iteration graph node 504 for the function or loop (e.g., for a nested loop) that the loop start is within. For a second or higher iteration of a loop, the pipeline shader program adds a loop iteration graph node 504 as a sibling node of the loop iteration graph node 504 corresponding to the previous iteration of the loop. Adding a second node "as a child" of a first node means adding a child pointer 508 to the first node that points to the second node. Adding a second node "as a sibling" of a first node means adding a sibling pointer 510 to the first node that points to the second node.

The assign persistent resource for function instruction 438 or assign persistent resource for loop iteration instruction 440 (collectively, "assign instruction") causes the local variables of the function or loop iteration to be assigned with a handle to an appropriate resource slot. If the corresponding node (the node corresponding to the function or loop iteration in which the assign instruction is within) existed before the current instance of execution of this function or loop iteration, then the assign instruction assigns to the local variables the handles for the resource slots that are already stored in the resource identifier 506. If the corresponding node did not exist before the current instance of execution, then the assign instruction allocates the appropriate resource slots, assigns handle for the resource slots to the local variables, and stores those resource slots into the resource identifier 506 of the corresponding node.

The update persistent resource tracker for loop exit instruction 450 causes the resource tracker to return to the parent of the node corresponding to the first iteration. The update persistent resource tracker for function exit 452 causes the resource tracker to return to the parent node of the node corresponding to the current function.

It is possible for any node to include one or more child pointers 508. For example, if a function includes a function call and a loop, the node 502 for the function would include a first child pointer for the function call and a second child pointer for the loop. In another example, if a function includes two function calls, the node 502 for the function would include two child pointers 508. The first child pointer would point to the function graph node 502 corresponding to the first function and the second child pointer would point to the function graph node 502 corresponding to the second function. In yet another example, if a loop iteration includes a function call and a nested loop, the loop iteration graph node 504 includes a child pointer 508 to the loop iteration graph node 504 for the nested loop and another child pointer 508 to the function call. Such a loop iteration graph node 504 could also include a sibling pointer 510 to a loop iteration graph node 504.

In some examples, the compiler 402 generates at least a part of the graph by statically analyzing the program 404. The compiler 402 records the number of loops, the number of function calls, the number of resources for each function call or loop, and the number of nodes (function calls or loops) within a function or loop body. These items are recorded regardless of whether execution of the items is conditional (e.g., regardless of whether an if statement is used). The compiler 402 configures the update persistent tracker for function entry 436 or the update persistent resource tracker for loop iteration start 437 with this numerical information to generate an appropriate node based on the numbers of these items. For example, if four function calls exist in a function body, then these instructions (436 and 437) allocate four child pointers 508 in the node 502 for the function body. Continuing with this example, the assign persistent resource for function instruction 438 allocates a sufficient amount of space in the resource identifier 506 based on the number of resources for the function call. In some examples, the compiler 402 also calculates the ordinal of a loop or function call within the parent scope. The ordinal numbers are used to index the pre-reserved child pointer slots from the parent when entering a child loop.

Figure 6:
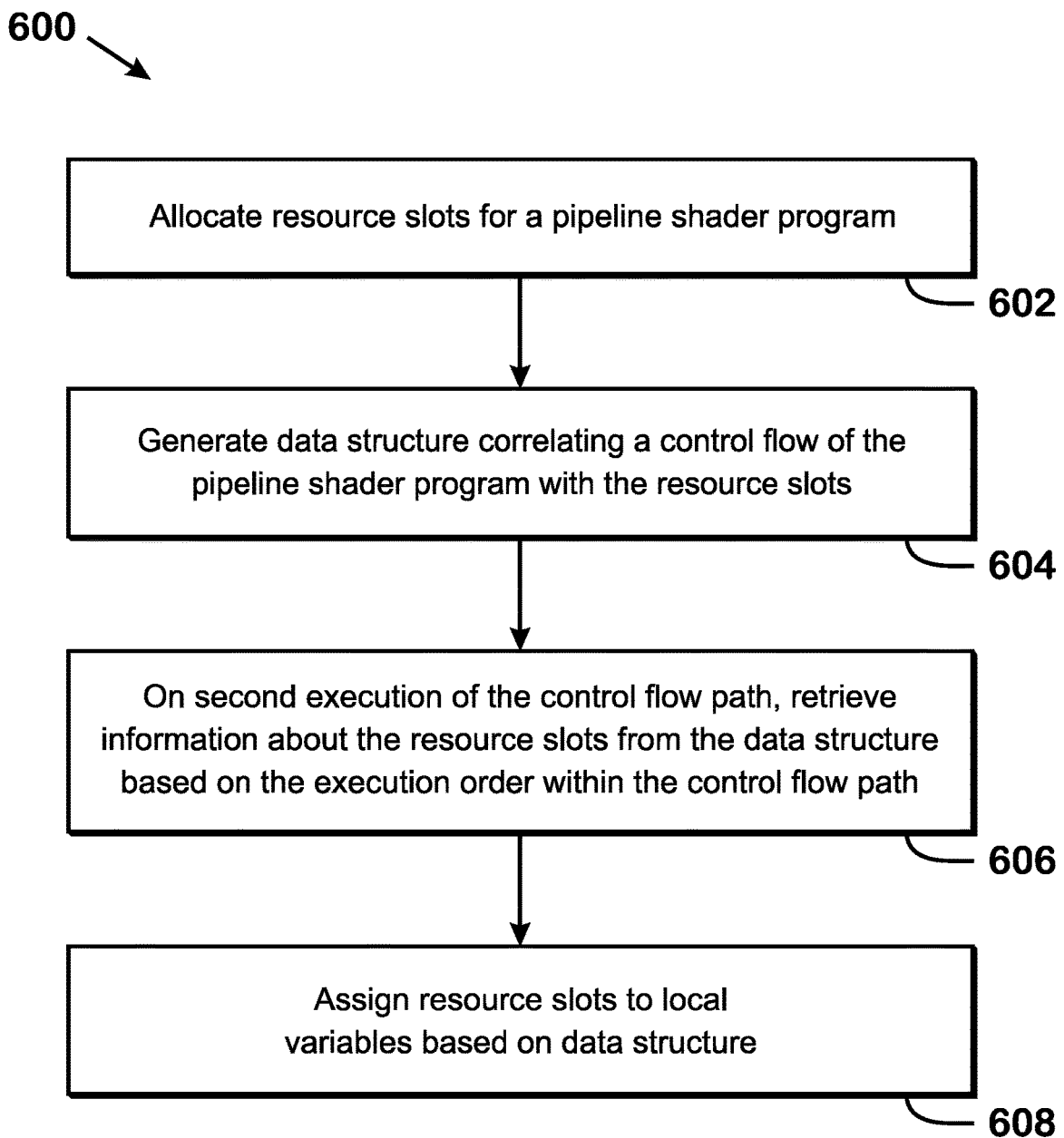
FIG. 6 is a flow diagram of a method for managing resources for an APD, according to an example.

FIG. 6 is a flow diagram of a method 600 for managing resources for an APD 116, according to an example. Although described with respect to the system of FIGS. 1-5, those of skill in the art will recognize that any system that performs the steps of the method 500 in any technically feasible order falls within the scope of the present disclosure.

At step 602, a pipeline shader program allocates resource slots. This allocation occurs the first time portions of the pipeline shader program execute. For example, when a function is called a first time, the resource slots referred to in that function are allocated. When a graphics or compute pass launched by that shader program is executed, the entity that executes that graphics or compute pass (e.g., the APD 116) allocates or obtains the actual resource associated with the resource slot, and updates the resource slot to refer to the resource.

At step 604, the pipeline shader program generates a data structure correlating the control flow of the pipeline shader program with the resource slots. This step begins with a node associated with the start of the pipeline shader program. The pipeline shader program includes, in the resource identifiers 506 for that node, the resources used at the top level of the pipeline shader program (e.g., in the first, "top level" portion of code of the pipeline shader program), in the resource identifier 506. In the event that the pipeline shader program encounters a function, the pipeline shader program includes a child pointer 508 in this node that points to a new function graph node 502 for that function. In the event that the pipeline shader program encounters a loop, the pipeline shader program includes a child pointer 508 in this node that points to a new loop iteration graph node 504. In the event that the pipeline shader program encounters subsequent loop iterations, the pipeline shader program includes a sibling pointer 510 within a loop iteration graph node 504 that points to a new loop iteration node 504. The pipeline shader program builds the graph in this manner, including the resources used in each function or loop iteration in the corresponding resource identifier 506. In addition, the pipeline shader program assigns the local variables of the function or loop iteration to the resource slots identified in the associated resource identifier 506.

At step 606, one a second execution of the pipeline shader program, and encountering the same control flow path (i.e., the same function calls and loop iterations), the pipeline shader program retrieves the resource slots from the corresponding resource identifiers 506. By following the control flow graph during execution (e.g., jumping to a child node when a function is called or when a loop is entered, jumping to a sibling when a subsequent loop iteration occurs, or returning to a parent node when a loop or function exits), the pipeline shader program traverses to the node associated with the current location in the control flow (e.g., the correct function or loop iteration). Thus the pipeline shader program is able to retrieve the correct resource slots for any given function or loop iteration. At step 608, the pipeline shader program assigns the resource slots to the local variables based on the data structure. It should be understood that on any given execution, the functions or loop iterations will launch graphics or compute passes with the resource slots assigned to the local variables. It is possible to continue building the data structure, for example, in the event that a function call or loop iteration is newly encountered. For example, in the event that a loop is iterated four times after only being iterated three or fewer times in previous frames, the pipeline shader program adds a new sister node for that fourth iteration.

The various functional units illustrated in the figures and/or described herein (including, but not limited to, the processor 102, the input driver 112, the input devices 108, the output driver 114, the output devices 110, the APD 116, the APD scheduler 136, the graphics processing pipeline 134, the compute units 132, the SIMD units 138, or each stage of the graphics processing pipeline 134 illustrated in FIG. 3) may be implemented as a general purpose computer, a processor, a processor core, or fixed function circuitry, as a program, software, or firmware, stored in a non-transitory computer readable medium or in another medium, executable by a general purpose computer, a processor, or a processor core, or as a combination of software executing on a processor or fixed function circuitry. The pipeline shader compiler 402 is implemented as software executing on any processor such as processor 102. The pipeline shader program 404 and pipeline shader program 434 are programs that execute on a processor such as the processor 102 or the APD 116. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, comprising:
   allocating a first set of resource slots for a first execution instance of a pipeline shader program;
   correlating the first set of resource slots with graphics pipeline passes, the correlating being based on a first set of points in execution order at which resource slots of the first set of resource slots are accessed; and
   on a second execution instance of the pipeline shader program, assigning a second set of resource slots, from the first set of resource slots, to the graphics pipeline passes, based on the correlating,
   wherein points of execution order of accesses to the second set of resource slots in the second execution instance, match points of execution order of accesses to the second set of resource slots in the first execution instance.

2. The method of claim 1, wherein assigning the resource slots on the second execution instance comprises:
   determining which resources are to be assigned to which graphics pipeline passes based on an execution order of the first execution instance of the pipeline shader program.

3. The method of claim 1, further comprising:
   during the first execution instance, upon encountering a first function call, recording an indication of a first function called by the first function call.

4. The method of claim 3, wherein:
   the first function call is within a parent function; and
   recording the indication includes recording an indication of an association between the first function call and the parent function.

5. The method of claim 3, further comprising:
   upon encountering a first loop, recording an indication of the first loop.

6. The method of claim 5, wherein:
   the first loop is within a first function; and
   recording the indication of the first loop includes recording an indication of an association between the first loop and the first function.

7. The method of claim 3, further comprising, upon encountering a loop iteration past a first loop iteration for a loop, generating an indication of the loop iteration.

8. The method of claim 7, wherein:
   generating the indication of the loop iteration includes associating the loop iteration with the first loop.

9. The method of claim 2, wherein correlating the first set of resource slots with the graphics pipeline passes is based on execution order within the first execution instance.

10. A system comprising:
    a memory; and
    a processor configured to execute instructions stored in the memory, the instructions causing the processor to:
    allocate a first set of resource slots for a first execution instance of a pipeline shader program;
    correlate the first set of resource slots with graphics pipeline passes, the correlating being based on a first set of points in execution order at which resource slots of the first set of resource slots are accessed; and
    on a second execution instance of the pipeline shader program, assign a second set of resource slots, from the first set of resource slots, to the graphics pipeline passes, based on the correlating,
    wherein points of execution order of accesses to the second set of resource slots in the second execution instance, match points of execution order of accesses to the second set of resource slots in the first execution instance.

11. The system of claim 10, wherein assigning the resource slots on the second execution instance comprises:
    determining which resources are to be assigned to which graphics pipeline passes based on an execution order of the first execution instance of the pipeline shader program.

12. The system of claim 10, wherein the instructions further cause the processor to:
    during the first execution instance, upon encountering a first function call, record an indication of a first function called by the first function call.

13. The system of claim 12, wherein:
    the first function call is within a parent function; and
    recording the indication includes recording an indication of an association between the first function call and the parent function.

14. The system of claim 12, wherein the instructions further cause the processor to:
    upon encountering a first loop, record an indication of the first loop.

15. The system of claim 14, wherein:
    the first loop is within a first function; and
    recording the indication of the first loop includes recording an indication of an association between the first loop and the first function.

16. The system of claim 12, wherein the instructions further cause the processor to:
    upon encountering a loop iteration past a first loop iteration for a loop, generate an indication of the loop iteration.

17. The system of claim 16, wherein:
    generating the indication of the loop iteration includes associating the loop iteration with the first loop.

18. The system of claim 11, wherein correlating the first set of resource slots with the graphics pipeline passes is based on execution order within the first execution instance.

19. A non-transitory computer-readable medium storing instructions that, when executed by a processor, cause the processor to perform operations comprising:
- allocating a first set of resource slots for a first execution instance of a pipeline shader program;
- correlating the first set of resource slots with graphics pipeline passes, the correlating being based on a first set of points in execution order at which resource slots of the first set of resource slots are accessed; and
- on a second execution instance of the pipeline shader program, assigning a second set of resource slots, from the first set of resource slots, to the graphics pipeline passes, based on the correlating,
- wherein points of execution order of accesses to the second set of resource slots in the second execution instance, match points of execution order of accesses to the second set of resource slots in the first execution instance.

20. The non-transitory computer-readable medium of claim 19, wherein assigning the resource slots on the second execution instance comprises:
- determining which resources are to be assigned to which graphics pipeline passes based on an execution order of the first execution instance of the pipeline shader program.

\* \* \* \* \*